US006651250B1

United States Patent
Takai

(10) Patent No.: US 6,651,250 B1
(45) Date of Patent: Nov. 18, 2003

(54) DIGITAL BROADCAST RECEIVING SYSTEM IN INFORMATION PROCESSOR

(75) Inventor: Kazuhito Takai, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/173,284

(22) Filed: Oct. 15, 1998

(30) Foreign Application Priority Data

Oct. 17, 1997 (JP) .............................................. 9-303415

(51) Int. Cl.$^7$ ........................ H04N 7/167; H04N 7/173; H04N 7/16
(52) U.S. Cl. ............................. 725/31; 725/89; 725/94; 725/113; 725/133; 380/241
(58) Field of Search ................................. 348/552, 553, 348/563; 725/1, 87, 89, 90, 92, 63, 111, 113, 115, 133, 141, 153, 31; 380/217, 228, 241

(56) References Cited

U.S. PATENT DOCUMENTS

| 5,590,202 | A | | 12/1996 | Bestler et al. |
| 5,602,920 | A | | 2/1997 | Bestler et al. |
| 5,619,501 | A | | 4/1997 | Tamer et al. |
| 5,675,654 | A | | 10/1997 | Ryan |
| 5,802,063 | A | * | 9/1998 | Deiss |
| 5,838,383 | A | * | 11/1998 | Chimoto et al. |
| 5,978,012 | A | * | 11/1999 | Ozawa et al. |
| 6,016,348 | A | * | 1/2000 | Blatter et al. |
| 6,057,890 | A | * | 5/2000 | Virden et al. |
| 6,195,642 | B1 | * | 2/2001 | Izumi et al. |
| 6,308,253 | B1 | * | 10/2001 | Gadre et al. |

FOREIGN PATENT DOCUMENTS

| EP | 0679028 | 10/1995 |
| EP | 0710025 | 5/1996 |
| EP | 0735776 | 10/1996 |
| EP | 0 794 669 | 9/1997 |
| EP | 0798932 | 10/1997 |
| JP | 5-328320 | 12/1993 |
| JP | 8-237154 | 9/1996 |
| JP | 8-275151 | 10/1996 |
| JP | 8-307784 | 11/1996 |
| JP | 9-224201 | 8/1997 |
| WO | 96/06504 | 2/1996 |

OTHER PUBLICATIONS

EBU Project Group B/CA; "Functional Model of a conditional access system", Jun. 10, 1995; XP 000559400; PP 64–77.*

(List continued on next page.)

*Primary Examiner*—Andrew Faile
*Assistant Examiner*—Kieu-Oanh Bui
(74) *Attorney, Agent, or Firm*—Dickstein, Shapiro, Morin & Oshinsky, LLP.

(57) ABSTRACT

A digital satellite broadcast receiving system is proposed in which the necessary packets of an MPEG2-based transport stream can be transferred to the system memory of a computer to facilitate processing of packets by a CPU. The system has means for filtering packets, by packet ID, from an MPEG2-based transport stream, which is output by a digital satellite broadcast tuner, to facilitate section formation from packets of the MPEG2-based transport stream by a CPU of a computer, filtering being performed after the transport stream is descrambled if the broadcast is a subscription broadcast; a buffer memory for storing the filtered data, which has been output by the filter means, until the data can be accessed by a host bus; and DMA control means for transferring, by direct memory access, content of the buffer memory to the system memory of the computer via the host bus.

7 Claims, 11 Drawing Sheets

OTHER PUBLICATIONS

Austrian Patent Office Search Report completed Dec. 23, 2002.

Hurley T.R.: "Evolution of the Digital Set Top Box" International Broadcasting Convention, London, GB, No. 428, 1996, pp. 277–282, CP000905436.

Cutts D.J.: "DVB Conditional Access" Electronics and Communication Engineering Journal Institution of Electrical Engineers, London, GB, vol. 9, No. 1, Feb. 1, 1997, pp. 21–27, XP000722905, ISSN: 0954–0695.

Fujii Y., et al.: "Implementation of MPEG Transport Demultiplexer With a Risc–Based Microcontroller" IEEE Transactions on Consumer Electronics, IEEE Inc. New York, US, vol. 42, No. 3, Aug. 1, 1996, pp 431,438 XP000638523, ISSN: 0098–3063, * paragraph '0003!; Figure 2*.

Gianchetti J–L et al.: "A Common Conditional Access Interface for Digital Video Broadcasting Decoders" IEEE Transactions on Consumer Electronics, IEEE Inc. New York, US. vol. 41, No. 3, Aug. 1, 1995, pp. 836–841, XP000539543, ISSN: 0098–3063.

Japanese Office Action issued Apr. 3, 2001 in a related applications with English translation of relevant portions.

* cited by examiner

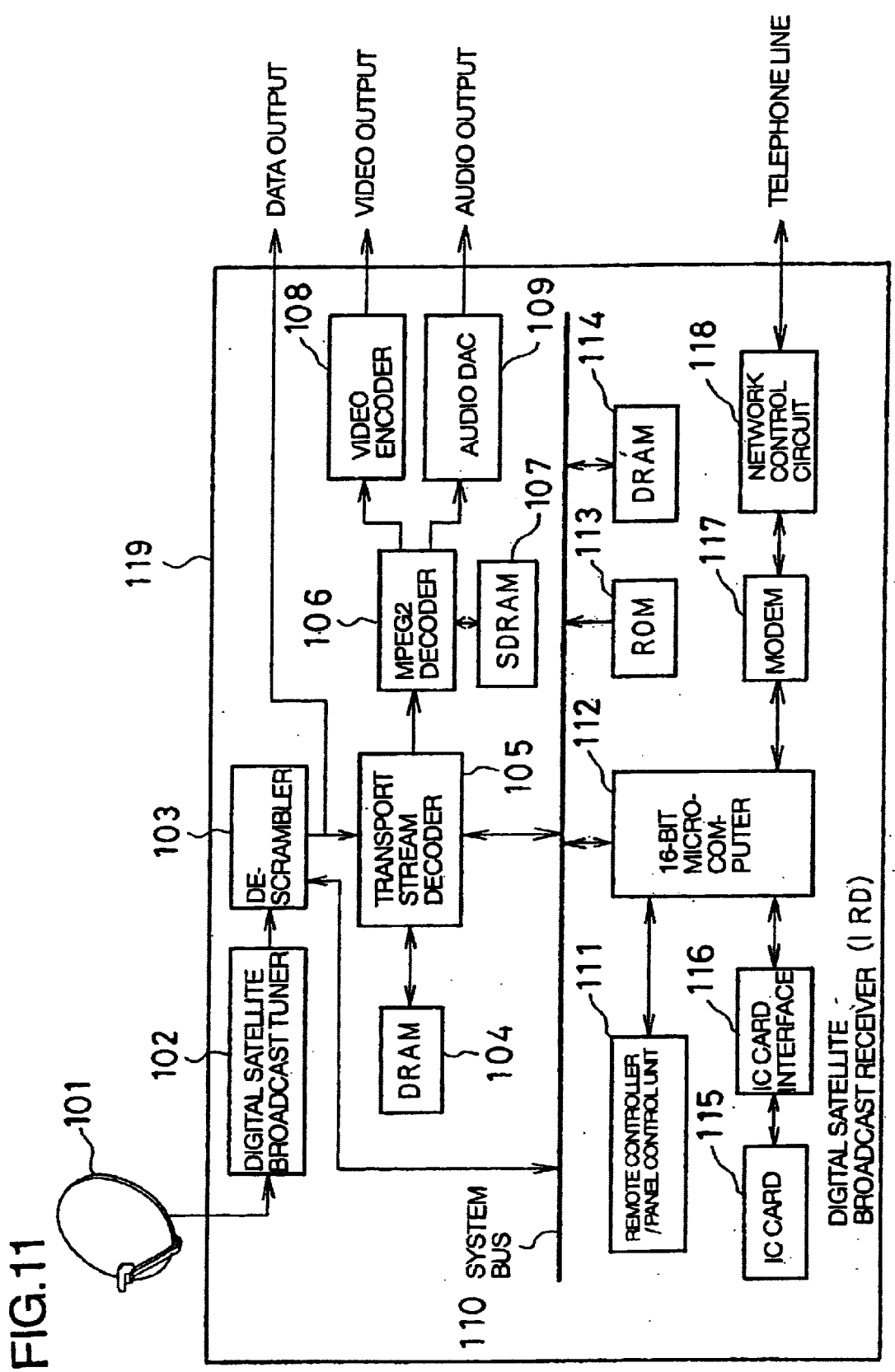

DIGITAL BROADCAST RECEIVING SYSTEM IN INFORMATION PROCESSOR

FIELD OF THE INVENTION

This invention relates to a system for receiving a digital broadcast in an information processor such as a computer. More particularly, the invention relates to a method of processing received data.

BACKGROUND OF THE INVENTION

Description of the Related Art

Examples of the prior art are disclosed in the following literature, by way of example: (1) Japanese Patent Kokai Publication JP-A-8-307784, (2) Japanese Patent Kokai Publication JP-A-8-237154 and (3) Japanese Patent Kokai Publication JP-A-5-328320.

JP-A-8-307784 discloses a method of receiving a TV broadcast at a personal computer which involves a method of making a connection when an analog terrestrial TV broadcast is received by the personal computer. Specifically, since a video signal, audio signal, data signal and control signal appear at the output of a broadcast reception card, a personal computer can be converted to an analog terrestrial TV receiving system if c the card is connected to circuitry within the personal computer. However, since a digital broadcast employs a receiving scheme different from that of an analog broadcast, it is not easy to realize the proposed system.

JP-A-8-237154 teaches to connect a tuner card for a digital broadcast to a personal computer, whereby the digital output of the tuner is input to the personal computer so that the personal computer can receive the digital broadcast with ease. With this set-up, however, a subscription broadcast cannot be received.

In order to receive a subscription broadcast, an IC card is necessary when the broadcast is a digital satellite broadcast. FIG. 11 illustrates the configuration of a typical digital satellite broadcast receiver system according to the prior art. As shown in FIG. 11, a digital satellite broadcast receiver 119, to which a parabolic antenna 101 is connected, includes a digital satellite broadcast tuner 102, a descrambler 103, a transport stream decoder 105, a DRAM 104, a decoder 106 in compliance with the MPEG2 standard, an SDRAM 107, a video encoder 108 and an audio D/A converter 109. The computer side of the receiver has a microcomputer 112, a ROM 113, a DRAM 114, a network control circuit 118 for controlling the connection to a telephone line, a modem 117, a control unit 111 associated with a remote controller and control panel, and an IC card interface 116. The microcomputer 112 sends data to and receives data from the transport stream decoder 105 and descrambler 103 via a system bus 110.

In the conventional system shown in FIG. 11, the special-purpose IC card 115 is required in order to view and hear a subscription broadcast. Information such as the channels capable of being received from a subscription broadcast for which the subscriber has given agreement is stored on the IC card and the card is always necessary to acquire the subscription broadcast. The conventional digital satellite broadcast receiver is controlled by the equivalent of a 16-bit microcomputer and performs operations such as the descrambling of a subscription broadcast. In order to decode MPEG2 transport streams, use is made of an LSI chip in special-purpose hardware and section formation of packets is carried out using a memory connected to or incorporated within the LSI chip.

Further, JP-A-5-328320 discloses an arrangement in which, in a manner similar to that of JP-A-8-307784, character information for an analog terrestrial character multiplex TV broadcast is input to a personal computer by an RS-232C interface. However, this arrangement does not support digital broadcast.

SUMMARY OF THE DISCLOSURE

The following problems have been encountered in the course of investigations toward the present invention.

Thus, the conventional systems have the following problems:

One problem is that section formation of packets constituting an MPEG2 transport stream is carried out by a special-purpose MPEG2 transport stream decoder LSI chip and a memory connected to or incorporated within the LSI chip. The reason for this is that the processing capability of the microcomputer that implements overall control is not adequate for carrying out the section formation.

A second problem is that in order to perform descrambling to receive a digital satellite subscription broadcast, a microcomputer executes processing which includes fetching a descrambling code that has been written to an IC card and descrambling scrambled packets contained in an MPEG2 transport stream output by a digital tuner. Since overall management of a digital satellite broadcast receiver is carried out by the microcomputer, cost would be too high if management were performed by a processor other than this microprocessor.

A third problem is that an MPEG2 decoder LSI chip comprising hardware is necessary in order to decode compressed video and audio in the digital satellite broadcast receiver. The reason for this is that the capability of the microcomputer controlling the receiver is not sufficient for executing MPEG2 decoding. Even if a processor having sufficient capability is developed, once the product is shipped the existing processor cannot be easily replaced by the processor of higher capability.

Accordingly, an object of the present invention is to provide a digital broadcast receiving system for use with an information processor, in which use of a special-purpose LSI chip is unnecessary for forming a section of packets of an MPEG2 transport stream, the section formation may be carried out by a computer CPU with the minimum amount of hardware, and it is unnecessary to use a special-purpose microcomputer for the descrambling that is needed to receive a subscription broadcast, with the descrambling being implemented by the minimum amount of hardware by performing control using the computer CPU, thus making it possible to exploit the processing capability of the computer CPU to the maximum extent.

Further objects of the present invention will become apparent in the entire disclosure.

According to one aspect of the present invention, the foregoing object is attained by providing a system for receiving a digital broadcast in an information processing apparatus such as a computer, the system having means for filtering an MPEG2-based transport stream and means for transferring the filtered stream to the system memory of a computer by DMA.

More specifically, the system according to the present invention includes filtering means for filtering packets, by a specified packet ID (termed PID), from a MPEG2-based transport stream output by a descrambler, DMA control means (DMA controller) for transferring the filtered output to a system memory of a computer, and a FIFO (First In First Out) memory, which is provided between the filtering means and the DMA control means, for when the computer bus is congested.

In another aspect of the invention, the system includes means for accessing an IC card from a computer CPU, and means for accessing a descrambler.

More specifically, the system according to the present invention includes an IC card interface for accessing an IC card, an RS-232C controller for performing communication of data, and an input/output (I/O) controller adapted so that access is possible from a computer CPU, the input/output controller providing a signal descrambler access and a signal for controlling a tuner.

Further, since accessing of an IC card involves a data transfer speed that is very low in comparison with the data transfer capability of a computer bus, a FIFO memory is provided between the RS-232C controller and the input/output controller in order to lighten the load on the computer bus when the IC card is accessed.

In operation, a MPEG2 transport stream output by a digital tuner is descrambled by a descrambler if the broadcast is a subscription broadcast that has been scrambled. If the broadcast is not a subscription broadcast, then the transport stream is allowed to pass through and is output as is.

The MPEG2 transport stream output by the descrambler is filtered based upon packet IDs contained in packets, only packets desired by the subscriber are extracted and these packets are transferred, by DMA, through a FIFO memory to the system memory of a computer by a DMA controller.

By virtue of this arrangement, only packets of identical PIDs are transferred to the system memory. As a result, the computer CPU is capable of executing processing for forming original transmitted section(s) while observing the headers of packets. This can be accomplished without subjecting the computer CPU to an excessive load.

In a case where a subscription broadcast is received, data that has been formed into section(s) is transferred via the input/output controller in an amount that conforms to the capacity of the FIFO memory. The FIFO memory transfers the data to the RS-232C controller, which proceeds to convert the data to serial data and transfer the data to the IC card interface.

The IC card interface transfers data to the IC card. Since accessing of the IC card is by half-duplexing, only the required number of items of data are transferred to the IC card. After all the necessary data has been transmitted, the IC card interface reads the data out of the IC card following a delay for processing involving the IC card.

The data that has been read out is converted to parallel data by the RS-232C controller and the data is transferred to the FIFO memory. When the data enters the FIFO memory, an interrupt signal is sent to the computer. The computer reads the data that has entered the FIFO memory out to the system memory via the input/output interface. The computer CPU outputs the data, which has been read out of the IC card, to the descrambler via the input/output controller. Thus the descrambler is capable of descrambling the data.

Thus, in accordance with the present invention, descrambling for receiving a subscription broadcast from the section formed data can be performed by the CPU of a computer.

Particularly, the present invention provides solution according to various specific aspects.

According to a first aspect, there is provided a system for receiving a digital satellite broadcast in an information processing apparatus. The system comprises:

(a) filter means for filtering packets, by packet ID, from an MPEG2-based transport stream, which is output by a digital satellite broadcast tuner, to facilitate section formation from packets of the MPEG2-based transport stream by a CPU of a computer, filtering being performed after the transport stream is descrambled if the broadcast is a subscription broadcast;

(b) a buffer memory for storing resulting filtered data, which has been output by said filter means, until the data can be accessed by a host bus; and (c) DMA control means for transferring, by direct memory access, content of said buffer memory to a system memory of the computer via the host bus.

According to a second aspect, there is provided a system receiving a digital broadcast in an information processing apparatus comprising:

(a) an input/output controller for writing/reading the content of the system memory obtained from the host bus in order that data for descrambling may be sent to the IC card by the CPU so that this data may be read out of the IC card;

(b) a second buffer memory for temporarily storing data sent to the IC card; and (c) RS-232C control means for transmitting data in said buffer memory to the IC card via an IC card interface;

(d) wherein after the data is transmitted to the IC card, the data for descrambling is read by said RS-232C control means via the IC card interface;

(e) wherein the data read by said RS-232C control means is stored temporarily by said second buffer memory until the data can be accessed by the host bus; and (f) wherein the descrambling data, which has been read out to the system memory from said second buffer memory via the host bus, is written to said descrambler via said input/output controller, whereupon a digital satellite subscription broadcast is descrambled.

In the aforementioned aspects, the buffer memory may each comprise a first in first out FIFO memory.

In the system of the first aspect, packets of a descrambled MPEG2-base transport stream are assigned video and audio IDs as IDs of packets in the MPEG2-based transport stream, the packets are transferred to a system memory of a computer by direct memory access, a video and audio MPEG2-based packetized elementary stream is created from the packets, which have been transferred to the system memory, by a CPU of the computer, the packets are decoded by the CPU, and the result of decoding video is transferred to a video display unit of the computer to display video on a display device, and the result of decoding audio is transferred to an audio reproducing unit of the computer to reproduce audio from a speaker.

In the system, the filter means for filtering packets from the MPEG2-based transport stream has a special-purpose filter for video and audio packets among the packets of a descrambled MPEG2-based transport stream;

the filter for video and audio packets allowing only a packetized elementary stream to pass, stores this output in an MPEG2-based transport stream buffer and transfers the stream to an MPEG2 decoder, followed by decoding the stream;

wherein the result of decoding video is transferred to a video display unit of a computer to display video on a display device; with the result of decoding audio being transferred to an audio reproducing unit of the computer to reproduce audio from a speaker;

wherein in order to achieve conformity between an encoder clock on the side of a broadcasting station and a decoder clock on the receiving side in said filter means, program clock reference data, termed PCR data, is filtered in the filter means for filtering the MPEG2-based transport stream; and wherein a controller of a voltage-controlled oscillator VCO has means for obtaining the difference between a filtered PCR value and the value of a count of decoder clock pulses supplied to the MPEG2 decoder, performing adjustment in such a manner that the PCR value and value of the count will agree, and adjusting clock frequency of the MPEG2 decoder from the voltage-controlled oscillator VCO.

In the foregoing system a digital terrestrial TV broadcast tuner is substituted for the digital satellite broadcast tuner, and a decoder for supporting high-definition-class high resolution is substituted for the MPEG2 decoder, so that digital terrestrial TV can be viewed by the computer.

According to a third aspect of the present invention, there is provided a system for receiving a digital satellite broadcast in an information processing apparatus. The system comprises:

(a) filter means for extracting packets having Ids that match a packet ID, termed PID, specified in advance, said packets being extracted from an MPEG2-based transport stream supplied by a digital satellite tuner, subject to via a descrambler for descrambling in case of a subscription broadcast;

(b) a buffer memory for temporarily storing a packet output by said filter means; and (c) DMA control means for transferring, by direct memory access, content of said buffer memory to a memory of the side of a computer.

This system, further comprises:

an IC card interface for accessing an IC card;

communication control means for communicating data with said IC card interface; and input/output control means for providing access from a CPU of the information processing apparatus;

wherein data on the IC card is read in via the IC card interface and stored in the memory on the said of the computer via the communication control means and the input/output control means, and a signal for supplying said descrambler with key data for descrambling and a control signal for controlling said tuner are output by said input/output control means; and wherein a second buffer is provided between the communication control means and said input/output control interface, reading/writing of the IC card and control of descrambling being controlled, upon receiving subscription broad cast, by said CPU.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a block diagram illustrating the configuration of a system according to the prior art.

DESCRIPTION OF THE PREFERRED EMBODIMENTS

Modes for practicing the present invention will be described below with reference to the drawings.

Figure 1:
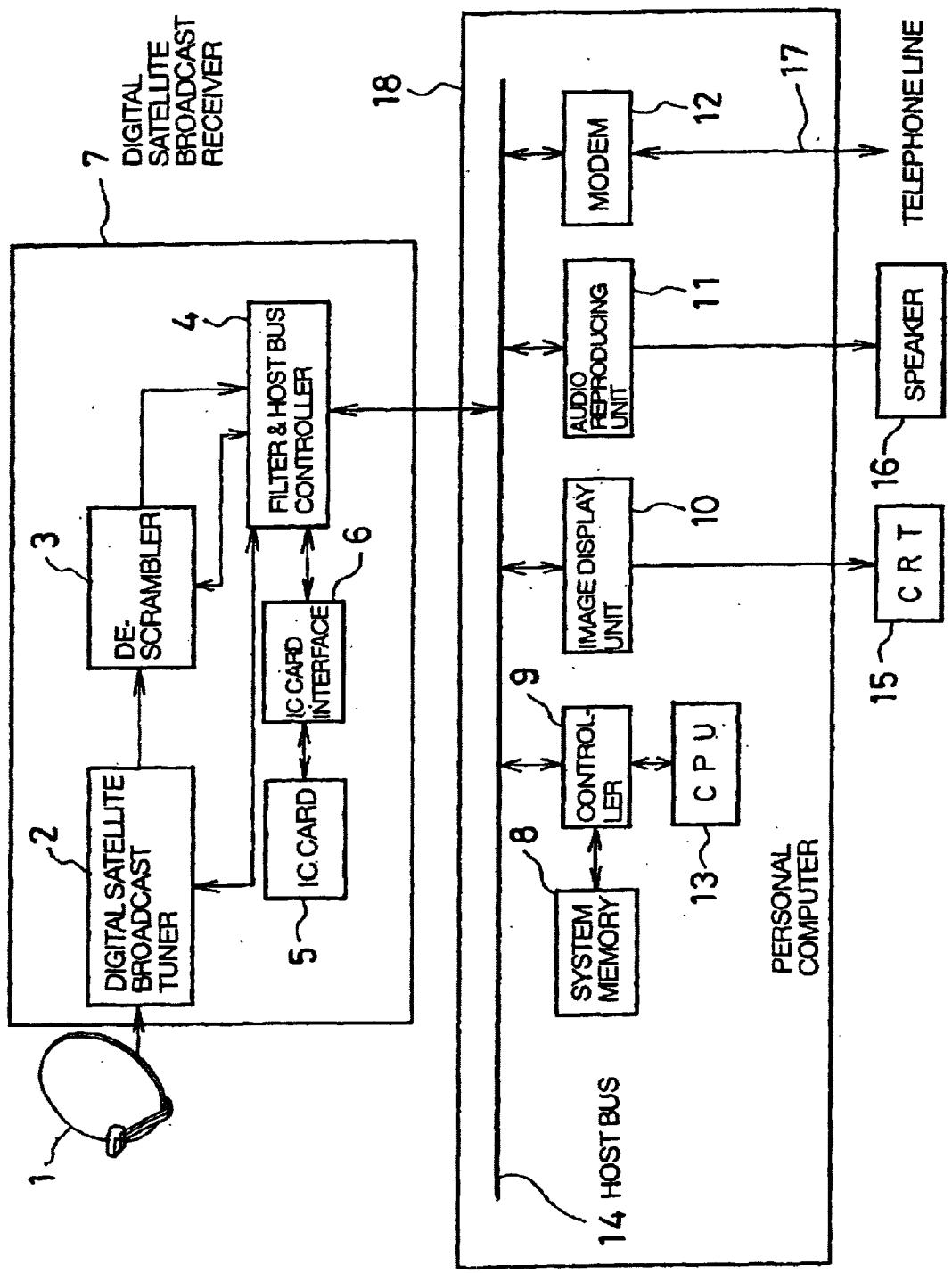
FIG. 1 is a block diagram illustrating the configuration of a system for practicing a mode of the present invention.

FIG. 1 is a block diagram illustrating the configuration of a system for practicing a mode of the present invention.

As shown in FIG. 1, a digital satellite broadcast receiving unit 7 has a parabolic antenna 1 for receiving the radio waves of a digital satellite broadcast, and a digital satellite broadcast tuner 2 for performing a transponder selection, demodulation for restoring the radio waves to the original digital signal, and error correction, thereby obtaining an MPEG2-based transport stream delivered as an output.

At this time the control terminal of the digital satellite broadcast tuner 2 is connected to a filter and host bus controller 4.

Next, the MPEG2 transport stream is transferred to the filter and host bus controller 4 via a descrambler 3. Key data for the purpose of descrambling is sent from the filter and host bus controller 4 to the descrambler 3.

The filter and host bus controller 4 has an interface for transmitting data to an IC card interface 6, which is for accessing an IC card 5. The filter and host bus controller 4 is connected to a host bus 14 of a personal computer 18 and is capable of accessing a CPU 13 of the personal computer 18. Thus the digital satellite broadcast receiving unit 7 is connected to the host bus of the personal computer 18.

The personal computer 18 generally executes data processing using the CPU 13, host bus 14 and a controller 9 for controlling a system memory 8. An image display unit 10 connected to the host bus 14 displays an image on a display device 15 such as a CRT, and an audio reproducing unit 11 connected to the host bus 14 produces audio from a speaker 16. A modem 12 connected to the host bus 14 makes possible data communication by being connected to a telephone line 17.

The operation of this mode of practicing the invention will be described in detail with reference to FIGS. 1 through 5.

Figure 2:
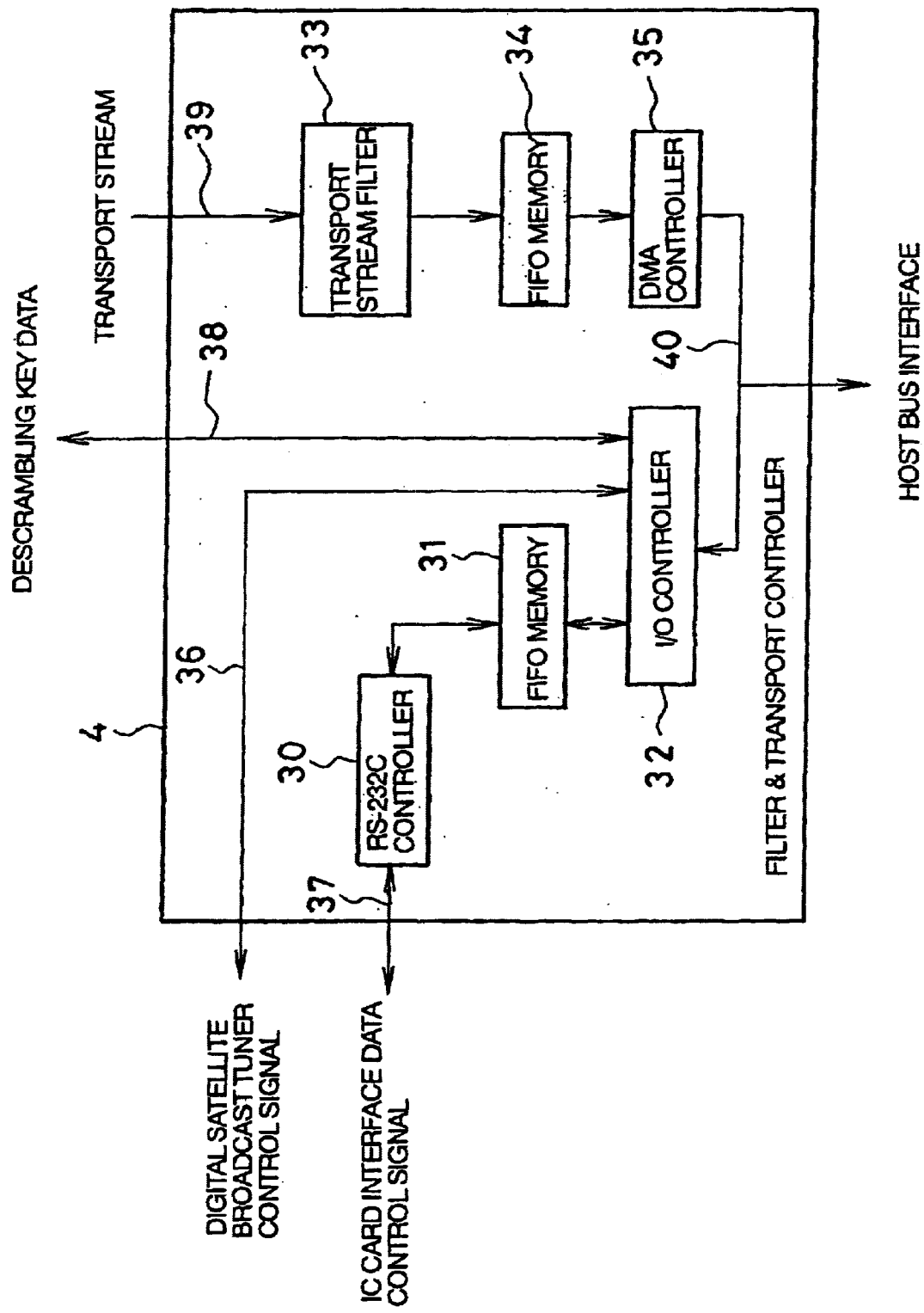
FIG. 2 is a block diagram showing the construction of a filter and transport controller in this mode of practicing the invention.
Figure 3:
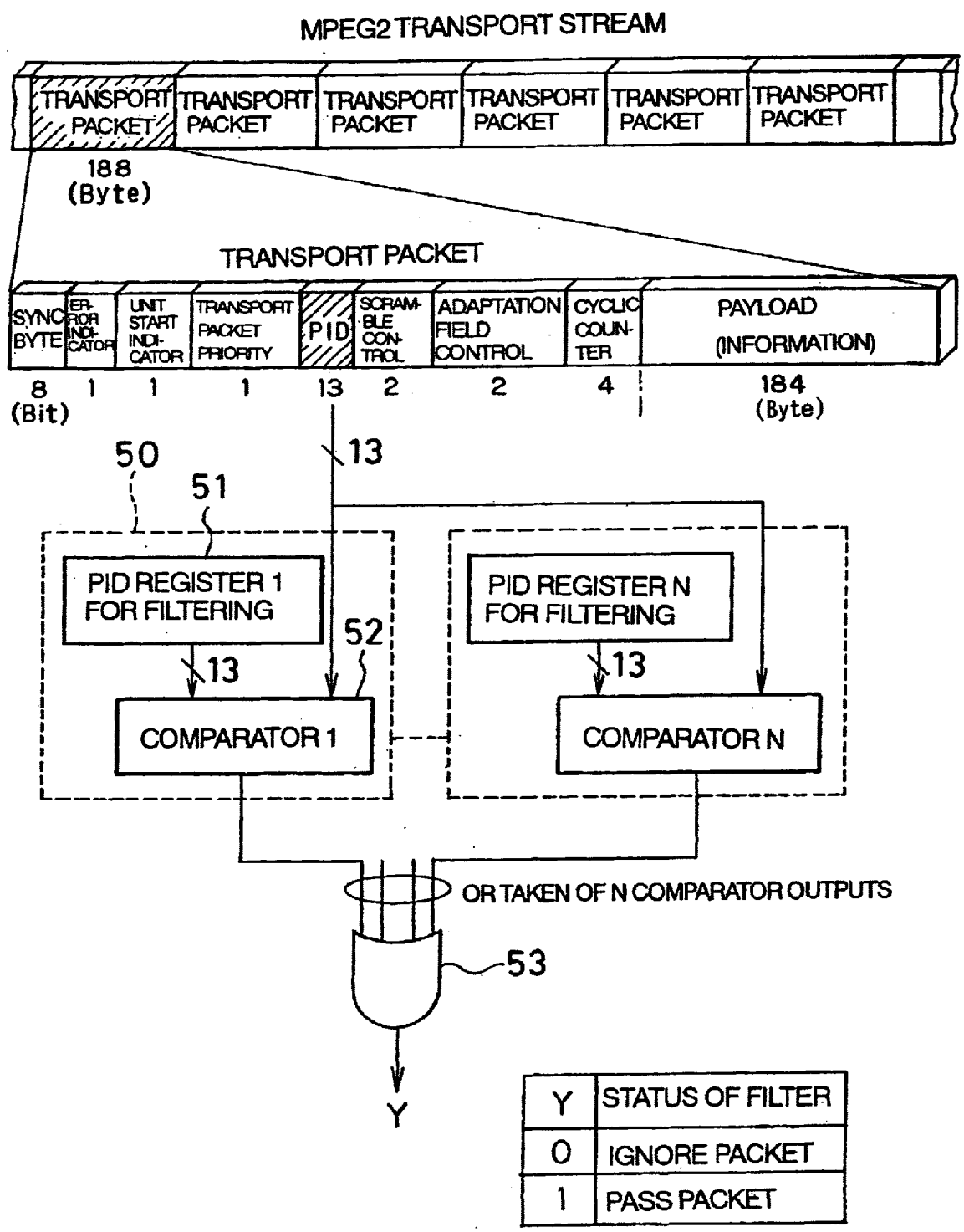
FIG. 3 is a diagram useful in describing the construction and principles of a filter in this mode of the practicing the invention.
Figure 4:
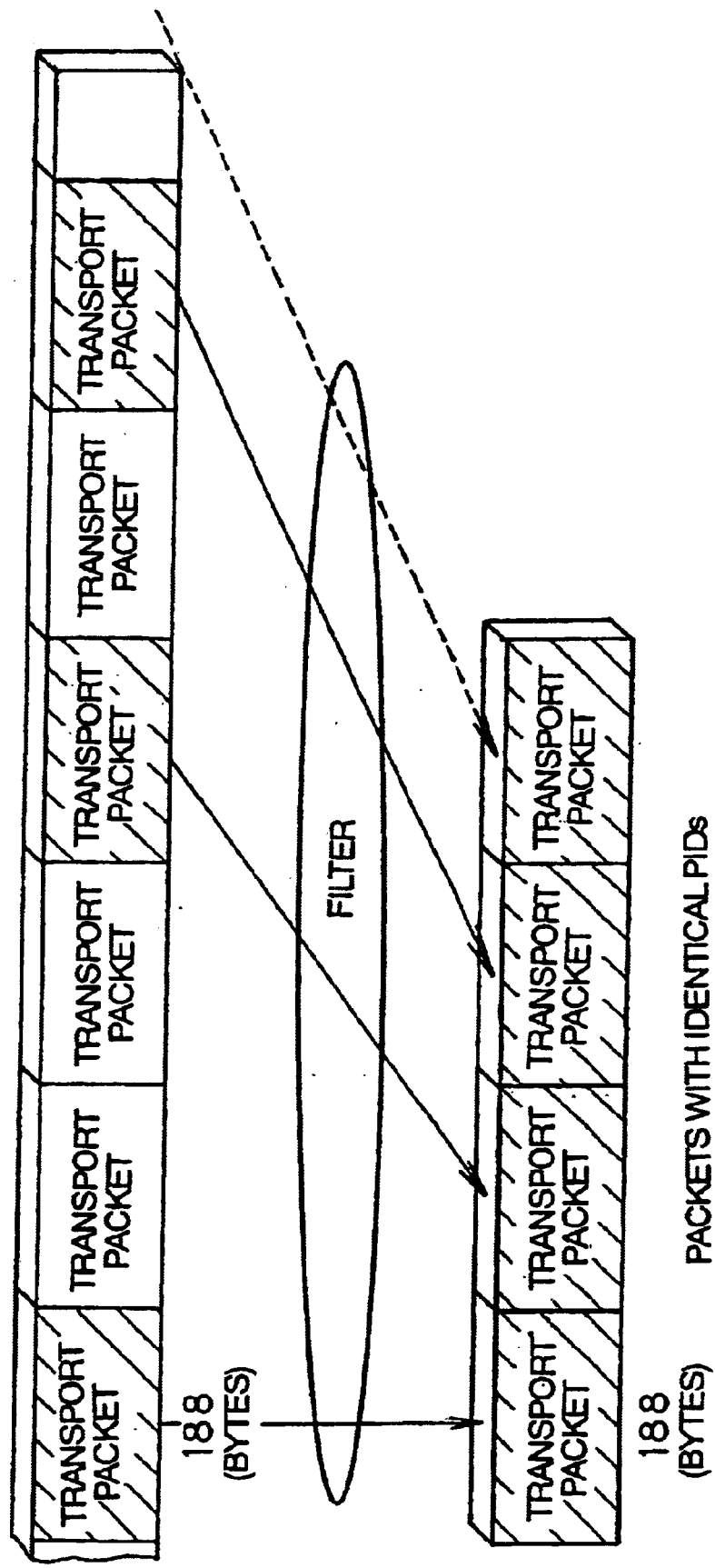
FIG. 4 is a diagram useful in describing the operation of the filter in this mode of the practicing the invention.
Figure 5:
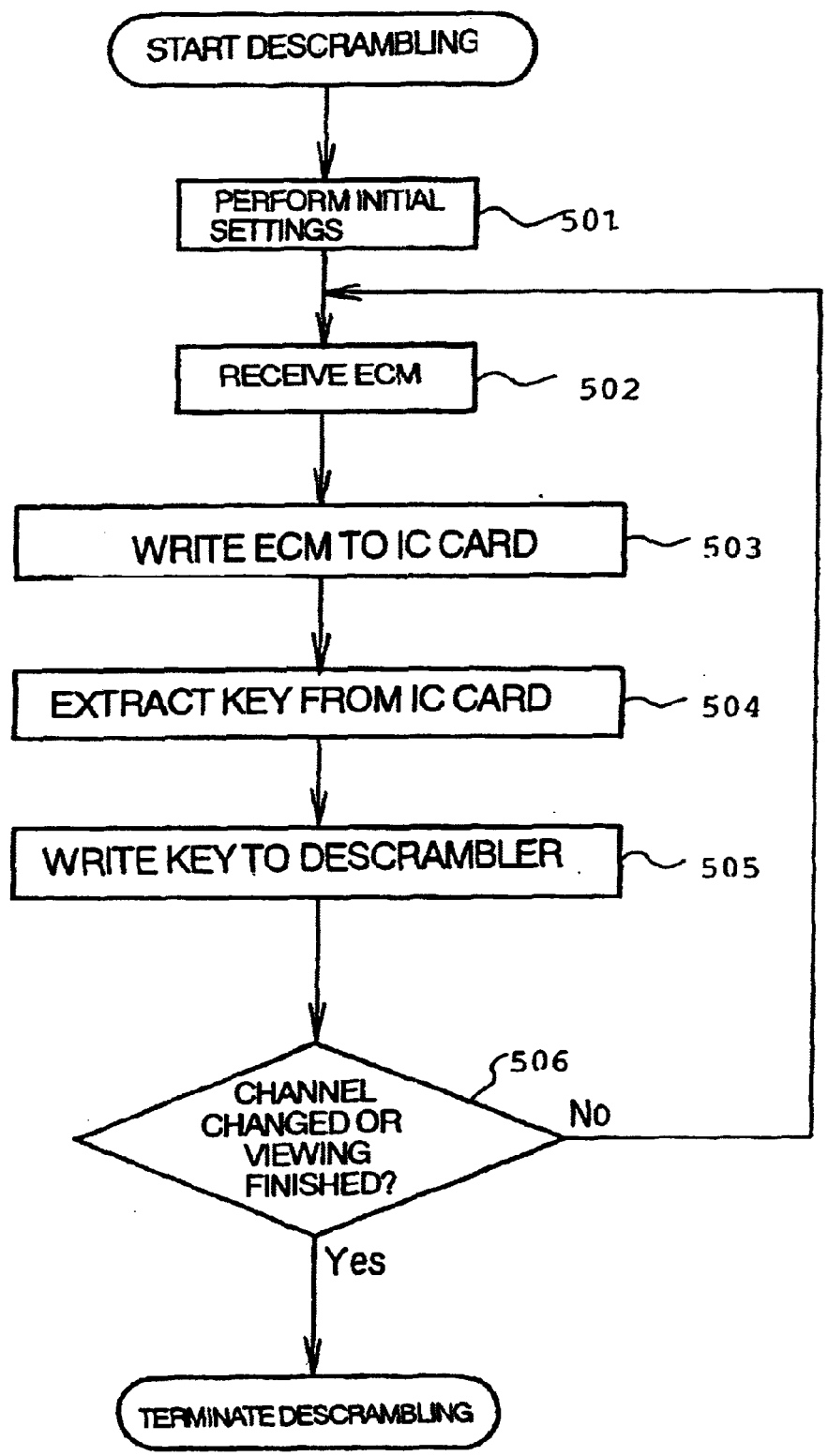
FIG. 5 is a flowchart illustrating the flow of processing for descrambling a subscription broadcast in this mode of the practicing the invention.

FIG. 2 is a block diagram showing the construction of the filter and host bus controller 4 in this mode of practicing the invention, FIG. 3 is a diagram useful in describing the construction and principles of the filter, FIG. 4 is a diagram useful in describing the operation of the filter, and FIG. 5 is a flowchart for describing the flow of processing for descrambling a subscription broadcast.

Radio waves are received by the parabolic antenna 1. Tuner setting, such as satellite transponder switching, demodulation and error correction are performed in the digital satellite broadcast tuner 2 by the CPU 13 of the personal computer 18, whereby the digital satellite broadcast tuner 2 outputs a MPEG2 transport stream. Since a subscription broadcast channel has not yet been descrambled, such a broadcast is descrambled by the descrambler 3 and converted to a descrambled MPEG2 transport stream in a case of subscription broadcast. At this time a key for the purpose of descrambling is sent from the system memory 8 of the personal computer 18 to the descrambler 3 under the control of the CPU 13.

As shown in FIG. 2, an MPEG2 transport stream 39 output by the descrambler 3 is filtered by a transport stream filter 33 in the filter and host bus controller 4. The transport stream 39 is filtered based upon the IDs of packets, which are desired to be filtered, decided beforehand by a program run by the CPU 13.

Reference will be had to FIG. 3 to describe the filtering operation.

The MPEG2 transport stream is composed of transport packets having a fixed length of 188 bytes.

Each transport packet comprises a synchronization byte; an error indicator, which indicates whether or not a bit error is present in the packet; a unit start indicator, which indicates that a new PES (Packetized Elementary Stream) starts from the payload of this transport packet; transport packet priority; a PID (Packet Identification address), which is 13-bit stream identification information that indicates the individual stream attribute of the packet; scramble control, which consists of two bits indicating whether scrambling of the packet payload is necessary and the type of scrambling; adaptation field control, which indicates whether the absence or presence of an adaptation field in this packet and the absence or presence of a payload; a cyclic counter, which consists of four bits representing information detecting whether some packets having the same PID have been discarded in-transit; and a 184-byte payload.

The filter is constituted by a filter block 50 comprising a filtering PID register 51 and a comparator 52. The filter examines the bits representing a PID in he MPEG2 transport stream. Specifically, the comparator 52 compares the value of the PID with the value of a PID, which is desired to be filtered, that has been set in the PID register 51 beforehand by the CPU 13. The comparator 52 outputs logical "1" when the compared PIDs match and logical "0" when the PIDs do not match.

A plurality of the filter blocks 50 may be used so that a plurality of PIDs may be filtered simultaneously. In such case the OR of the outputs of the filter blocks is obtained by an OR gate 53 and the output of the OR gate is the filter output.

The operation of packet filtering is decided by the state of the signal output by the filter. Let Y represent the output signal. The transport stream filter 33 operates in such a manner that a packet is ignored and discarded when Y is logical "0" but is transferred to a FIFO memory 34 of FIG. 2 when Y is logical "1".

Data that has been transferred to the FIFO memory 34 is DMA-transferred to the system memory 8 of personal computer 18 by a DMA controller 35. FIG. 4 illustrates the operation of this filter. It will be understood that packets (transport packets) whose PID values match the set PID values in the register 51 are extracted from the MPEG2 transport stream by the filter.

Since only packets required are filtered by the program of the CPU 13, only packets desired are transferred to the system memory 8 by the program.

The program executed by the CPU 13 examines the data that has been transferred to the system memory 8. Since the packets are continuous, a section forming operation for restoring the packets to the original section of packets can be performed with ease.

In a case where filtering has been performed based upon a plurality of PIDs, data can be transferred without sacrificing the continuity of identical packets if the transfer destination addresses of the system memory 8 are changed accordingly when the DMA transfer is performed.

Operation when receiving a subscription broadcast will be described with reference to the flowchart of FIG. 5.

When a subscription broadcast is to be received the first time, it is necessary for the customer to previously enter into an agreement with the broadcast provider and write EMM (Entitlement Management Message) data to an IC card (step 501 in FIG. 5). The EMM data contains the subscription broadcast agreement information. When the customer concludes the agreement, the broadcasting station uses a satellite to transmit the EMM data together with the MPEG2 transport packets. The EMM data, therefore, is filtered and extracted by program.

The EMM data that has been extracted is sent to the FIFO memory 31 via the host bus 14 and an I/O (input/output) controller 32, which is shown in FIG. 2.

With reference to FIG. 2, the data from the FIFO memory 31 is converted to serial data by an RS-232C controller 30 and the converted data is written to the IC card 5 as the EMM data through the IC card interface 6.

Key information for descrambling cannot be read out of the IC card 5 unless this operation is carried out.

Further, card-specific ID information contained on the IC card 5 is read by the IC card interface 6 and converted to a parallel signal through the RS-232C controller 30, whence the parallel signal is transferred to the FIFO memory 31. When the data has entered the FIFO memory 31, an interrupt is issued to the CPU 13, in response to which the CPU 13, in accordance with the program, transfers the data in the FIFO memory 31 to the system memory 8 via the host bus 14 by means of the I/O controller 32.

The ID information of the IC card 5 is set in the descrambler 3 in advance by the I/O controller 32 via the host bus 14. It is required that this be carried out in advance by an initial setting.

Next, ECM (Entitlement Control Message) data is received (step 502 in FIG. 5). The ECM data contains data needed to extract, from the IC card, the key for descrambling a subscription broadcast. The broadcasting station uses a satellite to transmit the ECM data, for every subscription broadcast program, together with the MPEG2 transport packets while the broadcast is being performed. The ECM data, therefore, is filtered and extracted by program.

The ECM data that has been extracted is sent to the FIFO memory 31 via the host bus 14 and an I/O controller 32, which is shown in FIG. 2. The data from the FIFO memory 31 is converted to serial data by the RS-232C controller 30 and the converted data is written to the IC card 5 as the ECM data through the IC card interface 6 (step 503 in FIG. 5).

Next, after a delay equivalent to the time necessary for processing data from the IC card 5, the key data needed for descrambling is transmitted. The key data is read by the IC card interface 6 (step 504 in FIG. 5) and converted to a parallel signal through the RS-232C controller 30, whence the parallel signal is transferred to the FIFO memory 31. When the data has entered the FIFO memory 31, an interrupt is issued to the CPU 13, in response to which the CPU 13, in accordance with the program, transfers the descrambling key data in the FIFO memory 31 to the system memory 8 via the host bus 14 by means of the I/O controller 32.

The descrambling key data is written to the descrambler 3 by the I/O controller 32 via the host bus 14 (step 505 in FIG. 5). The descrambler 3 descrambles packets of the scrambled MPEG2 transport stream output by the digital satellite broadcast tuner.

Thereafter, until the channel is changed or the customer terminates viewing ("YES" at step 506), control returns to the ECM reception processing step 502 to repeat the above-mentioned sequence of operations, namely execution of processing for receiving the ECM data, writing of the ECM data to the IC card, acquisition of the key data from the IC card and writing of the key data to the descrambler 3. If the channel is changed or the customer terminates viewing, the sequence of operations for descrambling is terminated.

Accordingly, if the descrambling processing is executed in the manner shown in FIG. 5 and the PID contained in the channel of the subscription broadcast is set in the filter, then descrambled video and audio will be transferred to the system memory 8 by DMA.

Consequently, when the program executed by the CPU extracts the payload of the packet, the CPU is capable of extracting the PES (Packetized Elementary Stream) of the respective MPEG2 video and audio. The extracted PES is decoded by the program executed by the CPU, the result of decoding an image is transferred to the image display unit 10 and video is displayed on the CRT 15.

The result of decoding audio is transferred to the audio reproducing unit 11 and audio is produced by the speaker 16.

DETAILED DESCRIPTION OF THE PREFERRED EMBODIMENTS

Preferred embodiments of the present invention will now be described in more detail with reference to the drawings.

Figure 6:
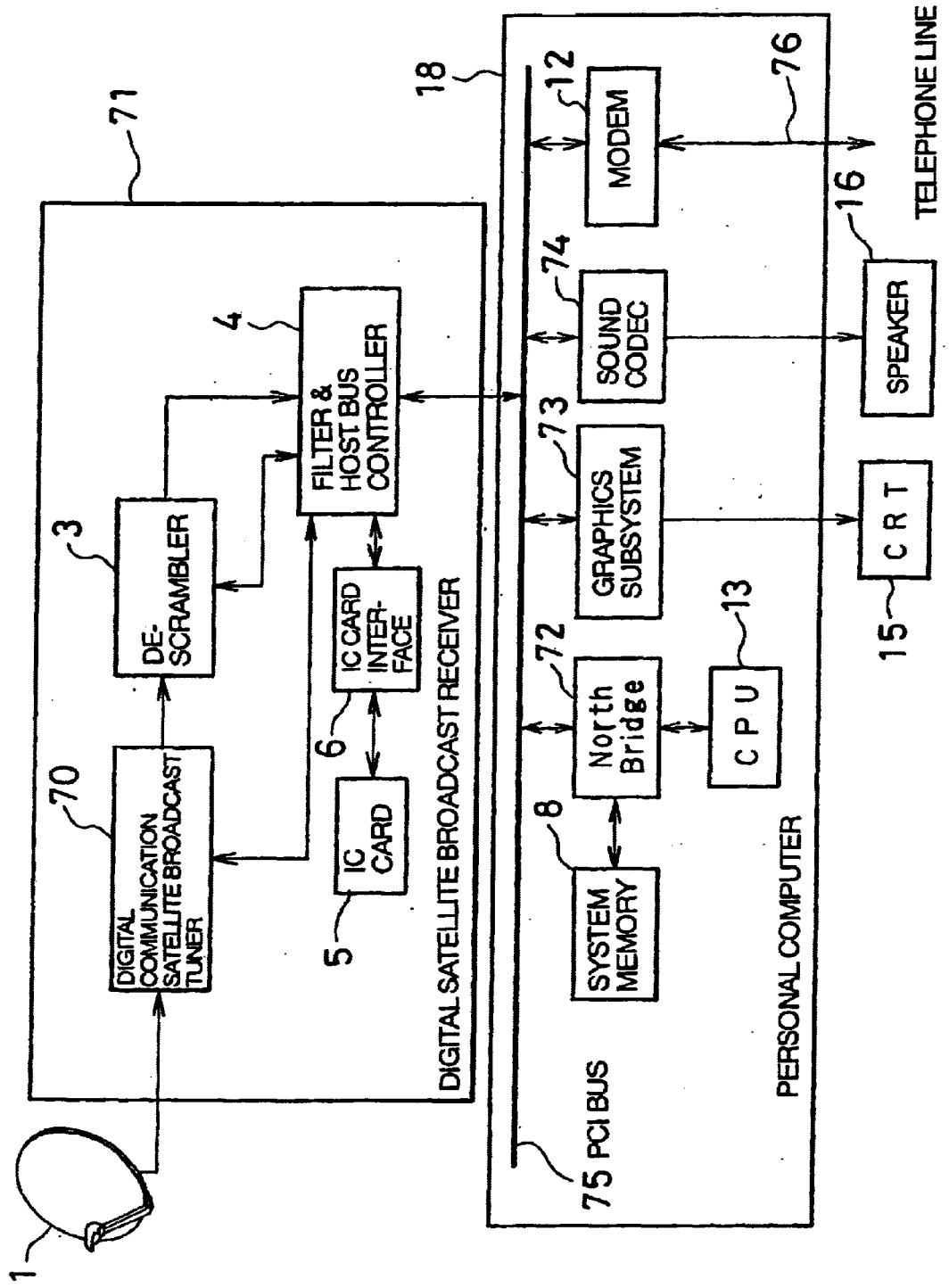
FIG. 6 is a block diagram illustrating the configuration of a system according to a first embodiment of the present invention.

FIG. 6 is a block diagram illustrating the configuration of a system according to one embodiment of the present invention.

As shown in FIG. 6, a digital satellite broadcast receiving unit 71 has the parabolic antenna 1 for receiving radio waves that have been broadcast using a communications satellite in conformity with the Japanese Telecommunications Technology Council (a partial report of Jul. 24, 1995 in response to Inquiry No. 74), and a digital communications satellite broadcast tuner 70 for performing a transponder selection, QPSK demodulation for restoring the radio waves to the original digital signal, and error correction, thereby obtaining an MPEG2 transport stream delivered as an output. At this time the control terminal of the digital satellite broadcast tuner 70 is connected to the filter and host bus controller 4.

Next, the MPEG2 transport stream is transferred to the filter and host bus controller 4 via the descrambler 3. Key data for the purpose of descrambling is sent from the filter and host bus controller 4 to the descrambler 3.

The filter and host bus controller 4 has an interface for communicating data to the IC card interface 6 for accessing the IC card 5 in order to receive a subscription broadcast sent using a communications satellite that is in conformity with the Japanese Telecommunications Technology Council (a partial report of Jul. 24, 1995 in response to Inquiry No. 74). The filter and host bus controller 4 is connected to a PCI (Peripheral Component Interconnect) bus 75 of the personal computer 18, whereby access is possible from the CPU 13 of the personal computer 18.

Thus, the digital communications satellite broadcast receiving unit 71 is connected to the PCI bus 75 of the personal computer 18.

The personal computer 18 generally executes data processing using the CPU 13, PCI bus 75 and a North Bridge 72 for controlling the system memory 8. An image is displayed on the CRT 15 by a graphics subsystem 73 connected to the PCI bus 75, and audio is reproduced from the speaker 16 by a sound CODEC 74 connected to the PCI bus 75. The modem 12 connected to the PCI bus 75 makes possible data communication by being connected to a telephone line 76.

The operation of the first embodiment will be described in detail with reference to FIGS. 2 through 6.

Radio waves are received by the parabolic antenna 1. Tuner setting, such as communications satellite transponder switching, QPSK demodulation and error correction are performed in the digital communications satellite broadcast tuner 2 by the CPU 13 of the personal computer 18, whereby the tuner 70 outputs an MPEG2 transport stream. Since a subscription broadcast channel has not yet been descrambled, such a broadcast is descrambled by the descrambler 3 and converted to a descrambled MPEG2 transport stream. At this time a key for the purpose of descrambling is sent from the system memory 8 of the personal computer 18 to the descrambler 3 under the control of the CPU 13.

The MPEG2 transport stream 39 output by the descrambler 3 is filtered by the transport stream filter 33 (see FIG. 2). The transport stream 39 is filtered based upon the IDs of packets, which are desired to be filtered, decided beforehand by the program run by the CPU 13.

Reference will be had to FIG. 3 to describe the filtering operation.

The filter is constituted by the filter block 50 comprising the filtering PID register 51 and the comparator 52. The filter examines the 13-bit information representing the PID of the MPEG2 transport stream. The comparator 52 compares the value of the PID with the value of a PID, which is desired to be filtered, that has been set in the 13-bit PID register 51 beforehand by the CPU 13. The comparator 52 outputs logical "1" when the compared PIDs match and logical "0" when the PIDs do not match. Sixteen of the filter blocks 50 may be used so that 16 PIDs may be filtered simultaneously. The OR of the outputs of the filter blocks is obtained by the OR gate 53, and the operation of packet filtering is decided by the state of the Y signal output by the OR gate 53. The transport stream filter 33 operates in such a manner that a packet is ignored and discarded when Y is logical "0" but is transferred to the 512-byte FIFO memory 34 when Y is logical "1".

Data that has been transferred to the FIFO memory 34 is DMA-transferred to the system memory 8 of personal computer 18 by the DMA controller 35. FIG. 4 illustrates the operation of this filter. Packets having identical PIDs are extracted, as shown in FIG. 4.

Since only packets required are filtered by the program of the CPU 13, only packets desired are transferred to the system memory 8 by the program.

The program executed by the CPU 13 examines the data that has been transferred to the system memory 8.

Since the packets are continuous, a section forming operation for restoring the packets to the original section can be performed with ease.

In a case where filtering has been performed based upon a 16 PIDS, data can be transferred without sacrificing the continuity of identical packets if the transfer destination addresses of the system memory 8 are changed when the DMA transfer is performed.

Operation when receiving a subscription broadcast will be described with reference to the flowchart of FIG. 5.

When a subscription broadcast is to be received the first time, it is necessary for the customer to previously enter into an agreement with the broadcast provider and write the EMM data to an IC card (step 501 in FIG. 5). The EMM data contains the subscription broadcast agreement information. When the customer concludes the agreement, the broadcasting station uses a satellite to transmit the EMM data together with the MPEG2 transport packets. The EMM data, therefore, is filtered and extracted by program.

The EMM data that has been extracted is sent to the 128-byte FIFO memory 31 via the PCI bus 75 and I/O controller 32. The data from the FIFO memory 31 is converted to serial data by the RS-232C controller 30 and the converted EMM data is written to the IC card 5 through the IC card interface (I/F) 6. The settings are: half duplex start-stop synchronization, one start bit, eight data bits, odd parity and 2-bit guard time. Key information for descrambling cannot be read out of the IC card 5 unless this operation is carried out.

Further, card-specific ID information contained in the IC card 5 is read by the IC card interface 6 and converted to a parallel signal through the RS-232C controller 30, whence the parallel signal is transferred to the FIFO memory 31. When the data has entered the FIFO memory 31, an interrupt is issued to the CPU 13, in response to which the CPU 13, in accordance with the program, transfers the data in the FIFO memory 31 to the system memory 8 via the PCI bus 75 by means of the I/O controller 32.

The ID information of the IC card 5 is set in the descrambler 3 in advance by the I/O controller 32 via the PCI bus 75. It is required that the above procedure be carried out in advance by an initial setting.

Next, the ECM data is received (step 502 in FIG. 5). The ECM data contains data needed to extract, from the IC card 5, the key for descrambling a subscription broadcast. The broadcasting station uses a communication satellite to transmit the ECM data, for every subscription broadcast program, together with the MPEG2 transport packets while the broadcast is being performed via the CS satellite. The ECM data, therefore, is filtered and extracted by program.

The ECM data that has been extracted is sent to the FIFO memory 31 via the PCI bus 75 and I/O controller 32. The data from the FIFO memory 31 is converted to serial data by the RS-232C controller 30 and the converted data is written to the IC card 5 as the ECM data through the IC card interface 6 (step 503).

Next, after a delay equivalent to the time necessary for processing data from the IC card 5, the key data needed for descrambling is transmitted. The key data is read by the IC card interface 6 (step 504 in FIG. 5) and converted to a parallel signal through the RS-232C controller 30, whence the parallel signal is transferred to the FIFO memory 31. When the data has entered the FIFO memory 31, an interrupt is issued to the CPU 13, in response to which the CPU 13, in accordance with the program, transfers the descrambling key data in the FIFO memory 31 to the system memory 8 via the host bus 14 by means of the I/O controller 32.

The descrambling key data is written to the descrambler 3 by the I/O controller 32 via the PCI bus 75 (step 505 in FIG. 5). The descrambler 3 descrambles packets of the scrambled MPEG2 transport stream output by the digital communication satellite broadcast tuner.

Thereafter, until the channel is changed or the customer terminates viewing ("YES" at step 506), control returns to the ECM reception processing step 502 to repeat the above-mentioned sequence of operations, namely execution of processing for writing of the ECM data to the IC card, acquisition of the key data from the IC card and writing of the key data to the descrambler 3. If the channel is changed or the customer terminates viewing, the sequence of operations for descrambling is terminated.

If the descrambling processing is executed in the manner shown in FIG. 5 and the PID contained in the channel of the subscription broadcast is set in the filter, then descrambled video and audio will be transferred to the system memory 8 by DMA.

Consequently, when the program extracts the payload of the packet, the CPU is capable of extracting the PES of the respective MPEG2 video and audio. The extracted PES is decoded by the program, the result of decoding an image is transferred to the graphics subsystem 73 and video is displayed on the CRT 15. The result of decoding audio is transferred to the sound CODEC 74 and audio is produced by the speaker 16.

A second embodiment of the present invention will now be described with reference to FIGS. 7, 8 and 9.

Figure 7:
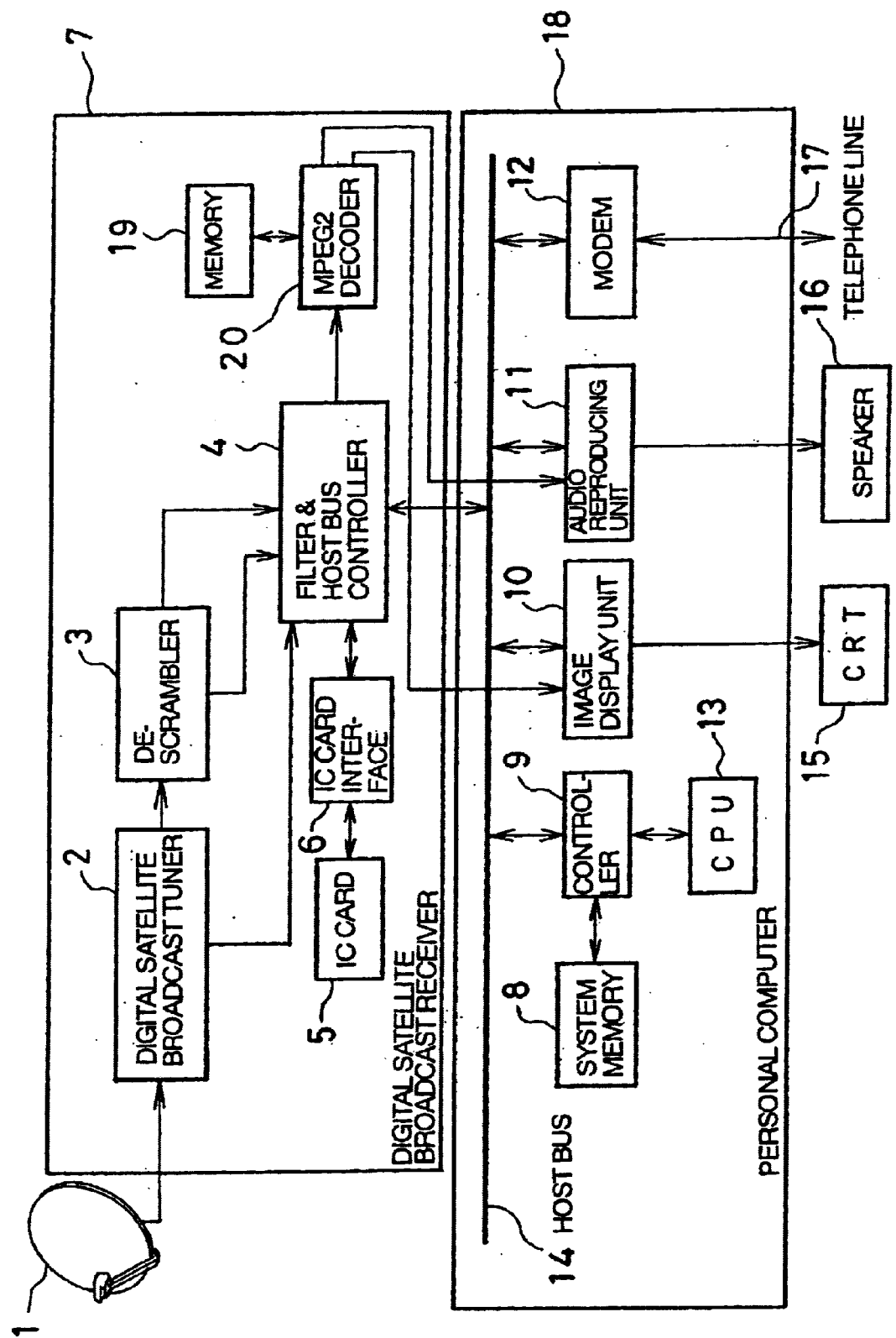
FIG. 7 is a block diagram illustrating the configuration of a system according to a second embodiment of the present invention.
Figure 8:
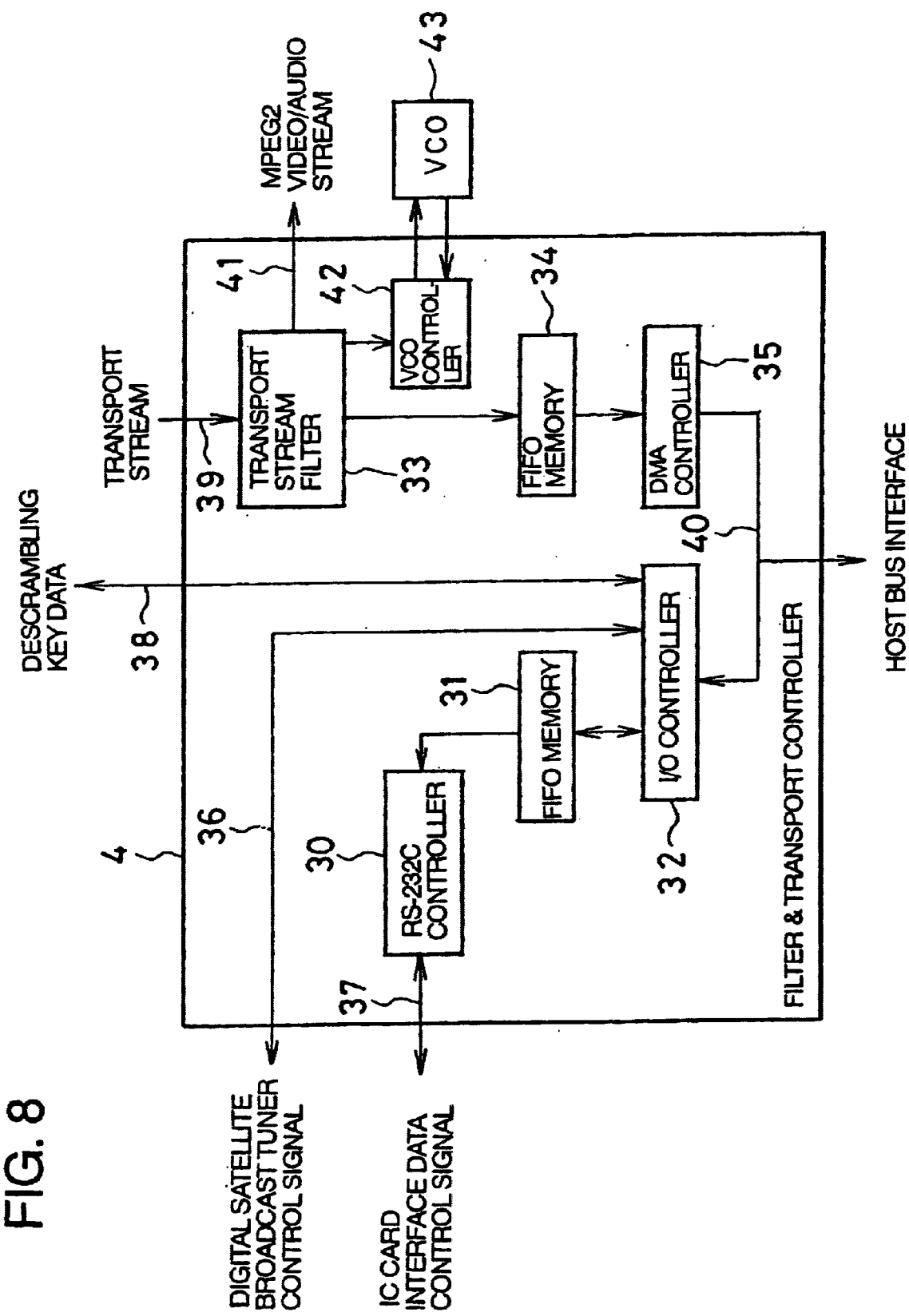
FIG. 8 is a block diagram showing the construction of a filter and transport controller according to the second embodiment.
Figure 9:
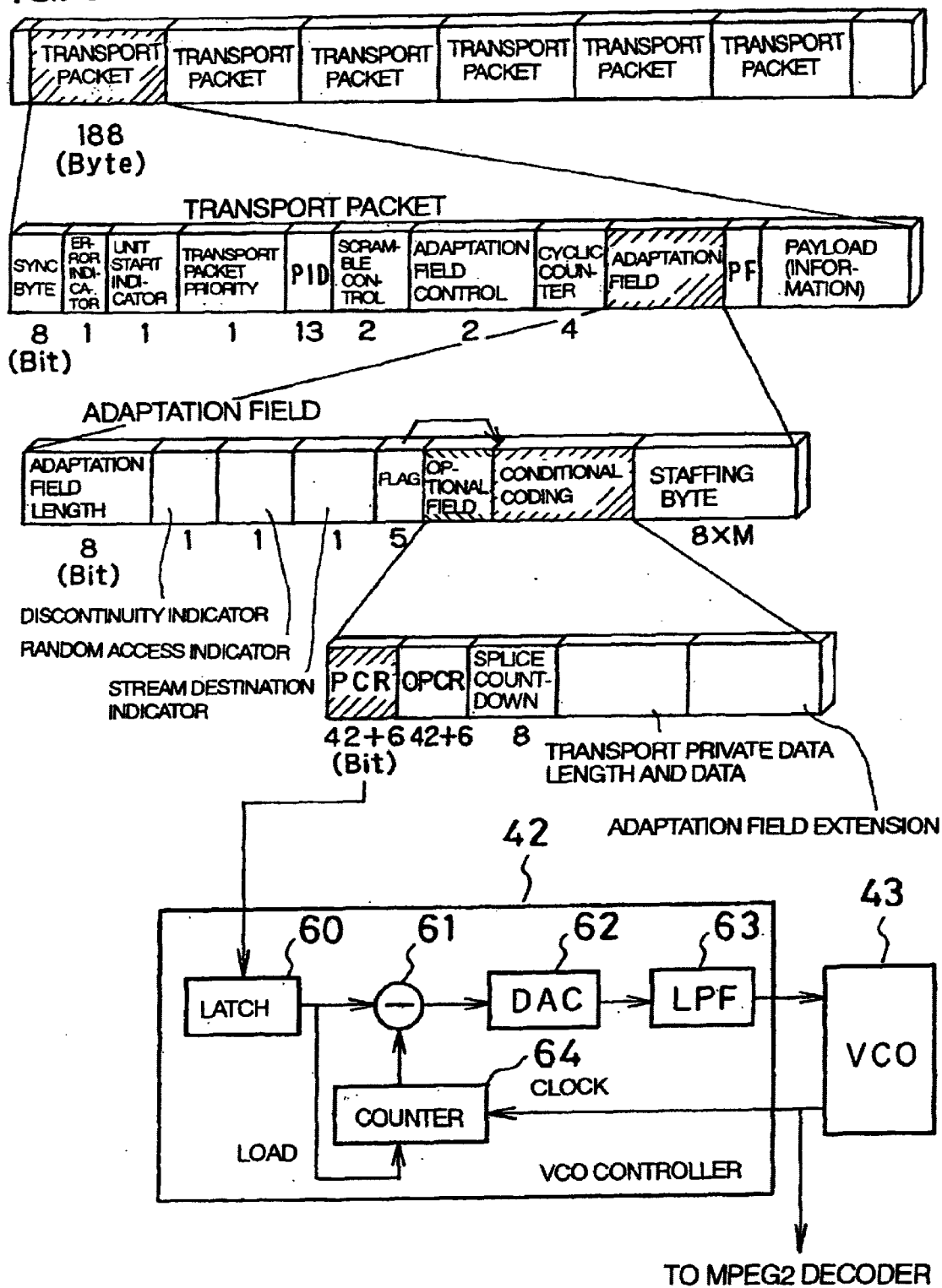
FIG. 9 is a diagram useful in describing the operation of a VCO controller according to the second embodiment.

In accordance with the second embodiment, as shown in FIGS. 7 through 9, the filter block of the transport stream filter 33 (see FIG. 8) of filter and host bus controller 4 is provided with two filters for extracting only the payloads of MPEG2 video and audio from packets and transferring these to a hardware-implemented MPEG2 decoder 20 (see FIG. 7) via a 512-byte transport buffer. The decoder 20 decodes the video and audio, applies its video output directly to the video display unit 10, without the intervention of the host bus (PCI bus), to display the video on the CRT 15, and applies is audio output to the audio reproduction unit 11 to produce audio from the speaker 16.

As shown in FIG. 7, a memory 19 serving as a decoding buffer is connected to the MPEG2 decoder 20.

In a case where MPEG2 decoding is performed by hardware, the transport stream filter 33 extracts a PCR (Program Clock Reference) that prevailed when encoding was carried out on the side of the broadcasting station. The PCR is latched by a latch 60, as shown in FIG. 9. When the latched PCR is the first PCR obtained after a channel is switched, the PCR is loaded simultaneously in a counter 64, which is counted up by the clock from the MPEG2 decoder 20. A subtractor 61 calculates the difference between the latched PCR and the value recorded by the counter 64, and the difference is converted to an analog signal by a D/A (digital-to-analog) converter 62. The D/A converter 62 is adjusted so as to indicate a median potential when the difference output by the subtractor 61 is zero and operates so as to raise the potential when the difference is positive and lower the potential when the difference is negative. In order to avoid erroneous operation when the output of the D/A converter (DAC) 62 exhibits a large fluctuation in potential, the output is directed through a low-pass filter (LPF) 63 and input to a frequency adjusting terminal of a voltage-controlled oscillator (VCO) 43 that is capable of finely varying clock oscillation frequency by a control voltage.

The VCO 43 outputs the clock of the MPEG2 decoder 20. The clock is input to the PCR counter 64 as well.

Operation is such that the clock output by the VCO 43 approaches the clock of the encoder on the side of the broadcasting station. This makes it possible to eliminate overflow and underflow of the transport buffer even if a broadcast is viewed for a long period of time.

This arrangement is advantageous when it is desired to lighten bus load or when it is desired to reduce the processing capability of the CPU 13 of personal computer 18.

Figure 10:
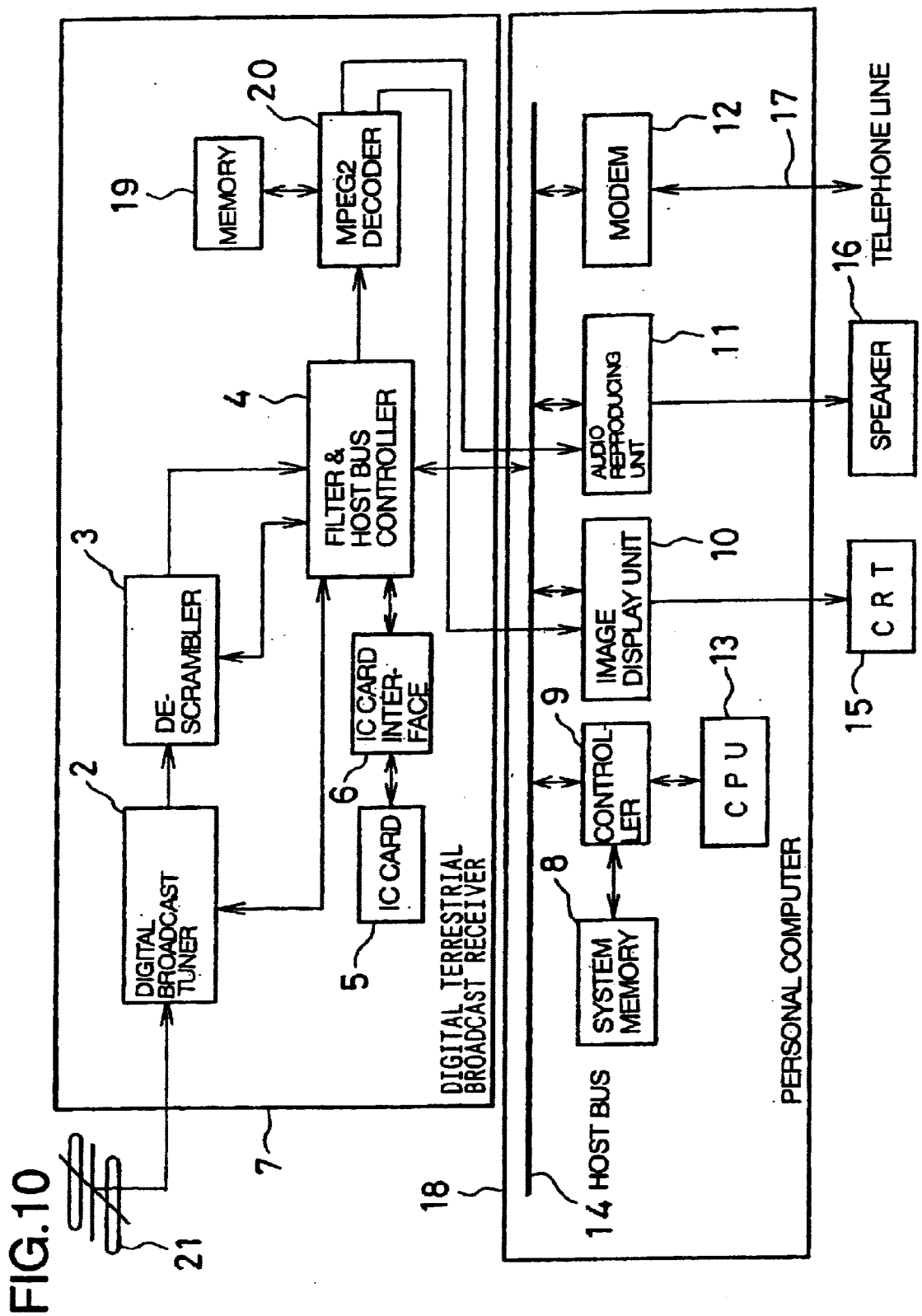
FIG. 10 is a block diagram illustrating the configuration of a system according to a third embodiment of the present invention.

A third embodiment of the present invention will now be described with reference to FIG. 10.

In the third embodiment, the present invention is applied to a digital TV broadcast by terrestrial waves. Such a system is planned for the near future. The basic hardware is similar to that of the second embodiment and only the differences thereof will be described.

A parabolic antenna is used for a satellite broadcast. When a broadcast relies upon terrestrial waves, however, use is made of a terrestrial wave antenna 21 of the kind that is currently employed in the ordinary home.

The tuner 2 also is changed from one for digital satellite broadcasts to one for digital terrestrial broadcasts. However, since the output of the tuner 2 is an MPEG2 transport stream, all other components of the digital broadcast receiving unit 7 and personal computer 18 are the same as those set forth above.

Further, it is expected that the digital terrestrial TV broadcasts will furnish high-resolution screen sizes on a par with high-definition TV and will not be limited to current screen sizes. Accordingly, it is required that the MPEG2 decoder in such case be one capable of decoding MP @ HL (Main Profile at High Level).

Thus, in accordance with the present invention, a umber of effects are obtained.

First, necessary packets in an MPEG2-based transport stream can be transferred to the system memory of a computer. This facilitates the processing of packets by the computer CPU. The reason for this is that the packets of an MPEG2 transport stream are filtered by PID in a digital broadcast receiver and input to a FIFO memory, after which the packets are transferred by a DMA controller to the system memory by DMA via the host bus of the computer.

Another effect is that the writing of data to an IC card and the descrambling of data can be controlled by the CPU of a computer when a subscription broadcast is received. As a result, ECM data can be sent to the IC card by the computer CPU and key data for descrambling purposes can be taken out of the IC card by the computer CPU. The computer CPU can then write the key data to a descrambler.

More specifically, in the present invention, data is transferred from the computer system memory to a FIFO memory via a host bus by an I/O controller and the data is converted to a serial signal by an RS-232C.

The data can then be transmitted from the IC card interface to the IC card. In addition, the data from the IC card is converted to a parallel signal via the IC card interface by the RS-232C controller, the data is transferred to the FIFO memory and the data is sent to the system memory via the host bus by the I/O controller. The data in the system memory is written to the descrambler via the host bus by the I/O controller.

As many apparently widely different embodiments of the present invention can be made without departing from the spirit and scope as disclosure herein and defined in the appended claims, it is to be understood that the invention is not limited to the specific embodiments thereof.

What is claimed is:

1. A system for receiving a digital broadcast in an information processing apparatus comprising:
    a computer including a CPU, a display device, a speaker, a video display unit, an audio reproducing unit and a host bus; and
    a digital satellite broadcast receiving unit which is connected to the host bus of the computer;
    said digital satellite broadcast receiving unit including:
        a filter for filtering packets, by packet ID, inputting an MPEG2-based transport stream, which is output by the digital satellite broadcast tuner, from the MPEG2-based transport stream, which is output by a descrambler for descrambling in case of a subscription broadcast, to facilitate section formation from packets of the MPEG2-based transport stream by the CPU of the computer, filtering being performed after the transport stream is descrambled if the broadcast is a subscription broadcast;
        a buffer memory for storing resulting filtered data, which has been output by said filter, until the data can be accessed by the host bus; and
        a DMA controller for transferring, by direct memory access, a content of said buffer memory to a system member of the computer via the host bus;
        an input/output controller for writing/reading the content of the system memory obtained from the host bus in order that data for descrambling may be sent to the IC card by the CPU so that this data may be read out of the IC card;
        a second buffer memory for temporarily storing data sent to the IC card; and
        an RS-232C controller for transmitting data in said buffer memory to the IC card via an IC card interface;
        wherein after the data is transmitted to the IC card, the data for descrambling is read by said RS-232C controller via the IC card interface;
        wherein the data read by said RS-232C controller is stored temporarily by said second buffer memory until the data can be accessed by the host bus; and
        wherein the descrambling data, which has been read out to the system memory from said second buffer memory via the host bus, is written to said descrambler via said input/output controller, whereupon a digital satellite subscription broadcast is descrambled.

2. The system according to claim 1 wherein said buffer memory each comprises a first in first out FIFO memory.

3. The system for receiving a digital broadcast in an information processing apparatus according to claim 1,
    wherein packets of the descrambling MPEG2-base transport stream are assigned video and audio IDs,
    wherein said packets are transferred to the system memory of the computer by direct memory access,
    wherein a video and audio MPEG-2 based packetized elementary stream is created from the packets, which have been transferred to the system memory, by the CPU of the computer, wherein the packets are decoded by the CPU, and wherein the result of decoding video is transferred to the video display unit of the computer to display video on the display device, and the result of decoding audio is transferred to the audio reproducing unit of the computer to reproduce audio from the speaker.

4. The system for receiving a digital broadcast in an information processing apparatus according to claim 1, wherein said filter has a special-purpose filter for video and audio packets among the packets of a descrambled MPEG2-based transport stream;

said filter for video and audio packets allowing only a packetized elementary stream to pass, stores this output in an MPEG2-based transport stream buffer and transfers the stream to an MPEG2 decoder, followed by decoding the stream;

wherein the result of decoding video is transferred to the video display unit of the computer to display video on the display device;

with the result of decoding audio being transferred to the audio reproducing unit of the computer to reproduce audio from the speaker;

wherein in order to achieve conformity between an encoder clock on the side of a broadcasting station and a decoder clock on the receiving side in said filter means, program clock reference data, termed PCR data, is filtered in the filter means for filtering the MPEG2-based transport stream; and wherein a controller of a voltage-controlled oscillator VCO has means for obtaining the difference between a filtered PCR value and the value of a count of decoder clock pulses supplied to the MPEG2 decoder, performing adjustment in such a manner that the PCR value and value of the count will agree, and adjusting clock frequency of the MPEG2 decoder from the voltage-controlled oscillator VCO.

5. The system according to claim 4, wherein a digital terrestrial TV broadcast tuner is substituted for the digital satellite broadcast tuner, and a decoder for supporting high-definition-class high resolution is substituted for the MPEG2 decoder, so that digital terrestrial TV can be viewed by the computer.

6. A system for receiving a digital satellite broadcast in an information processing apparatus, the system comprising:

a computer comprising, a CPU, a display device, a speaker, a video display unit, an audio reproducing unit and a host bus; and a digital satellite broadcast receiving unit which is connected to the host bus of the computer;

said digital satellite broadcast receiving unit including:

a filter for extracting packets having Ids that match a packet ID, termed PID, specified in advance, said packets being extracted from an MPEG2-based transport stream supplied by a digital satellite tuner, to a descrambler for descrambling in case of a subscription broadcast;

a buffer memory for temporarily storing a packet output by said filter means;

a DMA controller for transferring, by direct memory access, content of said buffer memory to a memory of the side of the computer;

an IC card interface for accessing an IC card;

communication control means for communicating data with said IC card interface; and an input/output controller for providing access from the CPU of the information processing apparatus;

wherein data on said IC card is read in via said IC card interface and stored in the memory of the side of the computer via said communication control means and said input/output controller, and a signal for supplying said descrambler with key data for descrambling and a control signal for controlling said tuner are output by said input/output control means; and wherein a second buffer is provided between said communication control means and said input/output control interface, reading/writing of the IC card and control of descrambling being controlled, upon receiving subscription broadcast, by said CPU.

7. The system according to claim 6, wherein said buffer memory each comprises a first in first out FIFO memory.

* * * * *